United States Patent [19]

Benvenuto et al.

[11] Patent Number: 4,979,211
[45] Date of Patent: Dec. 18, 1990

[54] CLASSIFIER FOR HIGH SPEED VOICEBAND DIGITAL DATA MODEM SIGNALS

[75] Inventors: Nevio Benvenuto, Mestre, Italy; Thomas W. Goeddel, Fair Haven, N.J.

[73] Assignee: AT&T Bell Laboratories, Murray Hill, N.J.

[21] Appl. No.: 534,321

[22] Filed: Jun. 5, 1990

Related U.S. Application Data

[63] Continuation of Ser. No. 271,961, Nov. 16, 1988, abandoned.

[51] Int. Cl.[5] .............................................. G10L 5/00
[52] U.S. Cl. ......................................... 381/43; 381/46
[58] Field of Search ............................ 381/43, 46, 243

[56] References Cited

U.S. PATENT DOCUMENTS 4,542,525  9/1985  Hopf ....................................... 381/46
4,633,499  12/1986  Nishioka ................................ 381/43

OTHER PUBLICATIONS

*Digital Communication*, Edward A. Lee et al., Kluwer Academic Publishers, 1988, Sections 6.1-6.5, pp. 146-206.
*IEEE Transactions on Communications*, vol. COM-28, No. 11, Nov., 1980, "Self-Recovering Equalization and Carrier Tracking in Two-Dimensional Data Communication Systems" by Dominique N. Godard, pp. 1867-1875.
*IEEE Transactions on Communications*, vol. COM-30, No. 4, Apr. 1982, "Highly Sensitive Speech Detector and High-Speed Voiceband Data Discriminator in DSI-ADPCM Systems" by Yohtaro Yatsuzuka, pp. 739-750.

*Primary Examiner*—Emanuel S. Kemeny
*Attorney, Agent, or Firm*—Thomas Stafford

[57] ABSTRACT

An unknown voiceband digital data modem signal is classified as being generated by one of a plurality of possible digital data modem signal sources, e.g., CCITT V.29, CCITT V.32, CCITT V.33 or the like digital data modems. Classification is achieved by employing a blind, i.e., self-recovering, adaptive equalizer to remove effects of linear channel impairments and to generate a sequence of magnitude estimates at the symbol rate of the unknown voiceband digital data modem signal. The sequence of magnitude estimates is compared to predetermined representations of known possible voiceband digital data modem signals and the results of the comparison are used to identify the digital data modem signal source of the signal. In one example, the predetermined representations are templates of conditional density functions of magnitude estimates obtained from known voiceband digital data modem signals generated by corresponding digital data modem signal sources. The symbol rate detector detects bit rate and type of modulation.

9 Claims, 6 Drawing Sheets

TEMPLATE  j = 1
p(M(mT̂$_S$) | j = 1)

TEMPLATE j=2
$p(M(m\hat{T}_S) | j=2)$

TEMPLATE j = 3
$p(M(m\hat{T}_S) | j = 3)$

CLASSIFIER FOR HIGH SPEED VOICEBAND DIGITAL DATA MODEM SIGNALS

This application is a continuation of application Ser. No. 271,961, filed on Nov. 16, 1988 now abandoned.

TECHNICAL FIELD

This invention relates to signal classifiers and, more particularly, to an arrangement for classifying an unknown incoming signal as being generated by one of a plurality of digital data modem signal sources.

BACKGROUND OF THE INVENTION

In recent times, it has become desirable and important to be able to characterize accurately the kinds of voiceband digital data modem signals being transmitted in a network. This information is important and useful for network planning and management. Such voiceband digital data modem signals are transmitted by a variety of digital data modem signal sources, e.g., modems, data sets and facsimile units.

As is well known in the art, digital data modems are employed to transmit and receive information in digital form (bits) over voiceband communication channels. Such digital data modems of interest employ passband pulse amplitude modulation techniques, for example, quadrature amplitude modulation (QAM), phase shift keying (PSK) and the like. Some known CCITT standard type digital data modems are CCITT V.29, CCITT V.32 and CCITT V.33. Other high speed digital data modems are also known in the art.

It is known that these types of digital data modems encode groups of one or more bits of supplied digital information into symbols at a symbol rate, i.e., baud. The symbol rate is typically equal to or less than the incoming bit rate for high speed applications. The symbols are represented as complex quantities, i.e., constellation points, selected from an alphabet of possible symbols for the particular digital data modem. The real and imaginary components of the complex quantities are modulated by inphase and quadrature, i.e., cosine and sine, respectively, carrier signals for transmission. Such arrangements are known in the art, see for example, *Digital Communication*, authored by E. A. Lee and D. G. Messerschmitt, Kluwer Academic Publishers, Norwell, Ma., 1988, Chapter 6, Sections 6.1–6.5, pages 146–206.

By way of example, a known CCITT V.29 digital data modem operating at 9600 b/sec encodes groups of four (4) incoming bits into one of sixteen possible symbols which are then transmitted at the symbol rate of 2400 baud.

Heretofore, attempts at characterizing the types of voiceband digital data modem signals being transmitted were simplistic and yielded inaccurate results. In one example, a signal is classified as being a voiceband digital data modem signal if an echo suppressor (canceler) disable tone is identified as being transmitted. Problems with such an arrangement are that all digital data modem signal sources do not transmit such disable tones, and the disable tone does not identify the specific type of digital data modem signal source or its transmission rate. Another problem with this prior arrangement is that the echo suppressor (canceler) disable tone typically is not transmitted in both directions of transmission. Therefore, both directions of transmission would have to be monitored in attempting to characterize the signals being transmitted in the network.

Another way of characterizing, i.e., identifying, such a digital data modem signal as to its source would be to simply use an array of digital data modem demodulators. Such an arrangement is undesirable because of the number of demodulators that would be required to detect the different types of digital data modem signals being transmitted. Additionally, as is known in the art, such demodulators must be on line at the on-set of the transmission of the digital data modem signal to insure synchronization and correct demodulation.

More recently, voiceband digital data modem signals have been classified as having a specific symbol rate and a specific modulation scheme, as described in co-pending U.S. patent application, Ser. Nos. 927,506 and 927,503, both filed on Nov. 6, 1986 now U.S. Pat. Nos. 4,815,136 and 4,815,137, respectively, both issued on Mar. 21, 1989. These classifier arrangements, however, also fail to identify the specific digital data modem source that is generating the voiceband data signal.

SUMMARY OF THE INVENTION

Classification of an incoming unknown voiceband digital data modem signal as being generated from a particular digital data modem signal source e.g., CCITT V.29, CCITT V.32, CCITT V.33 or the like digital data modems, is realized, in accordance with an aspect of the invention, by generating prescribed magnitude estimates at the nominal symbol rate of the incoming unknown voiceband digital data modem signal. The prescribed magnitude estimates are employed in a prescribed manner to identify the digital data modem signal source.

Specifically, the prescribed magnitude estimates are generated by employing an adaptive equalizer and, then, are compared to a predetermined set of representations of possible voiceband digital data modem signals. The results of the comparison are advantageously used to identify the voiceband digital data modem signal as being generated by a particular digital data modem signal source.

More specifically, the symbol rate of the unknown digital data modem signal is determined and used in conjunction with a blind, i.e., self-recovering, adaptive equalizer to generate a sequence of magnitude estimates. Then, the sequence of magnitude estimates is used to infer the constellation of the incoming voiceband digital data modem signal and, therefore, identify the digital data modem signal source. In a specific example, this is achieved by comparing the generated sequence of magnitude estimates to a predetermined set of templates. In one example, the templates comprise predetermined representations of sequences of magnitude estimates for the most likely to occur voiceband digital data modem signals under various transmission conditions, i.e., transmission impairments.

DETAILED DESCRIPTION

It is important to note that an embodiment of the invention is employed to characterize an unknown voiceband digital data modem signal as being generated from one of a plurality of digital data modem signal sources. Prior knowledge of the signal is lacking. Specifically, symbol rate, modulation scheme, transmit filtering, carrier frequency, phase, data constellation and channel conditions regarding the signal are all unknown. Thus, the technical advantage of the invention is that unknown voiceband digital data modem signals are classified as being generated by particular digital data modem signal sources without prior knowledge of the unknown signal characteristics.

Figure 1:
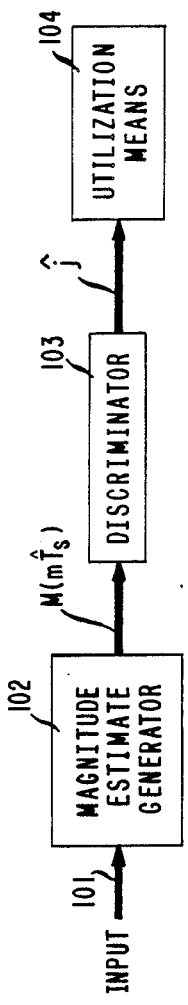
FIG. 1 depicts, in simplified block diagram form, a classifier arrangement employing aspects of the invention to classify unknown incoming voiceband digital data modem signals.

FIG. 1 shows, in simplified block diagram form, a classifier employing an embodiment of the invention. Accordingly, an incoming unknown signal to be classified as being a particular voiceband digital data modem signal is supplied via input terminal 101 to magnitude estimate generator 102. Magnitude estimate generator 102 employs a so-called "blind", i.e., self-recovering, equalization technique to remove the effects of linear channel impairments and to generate magnitude estimates of the constellation substantially at the symbol rate of the unknown voiceband digital data modem signal, namely, $M(m\hat{T}_s)$. Magnitude estimates $M(m\hat{T}_s)$ are supplied to discriminator 103 where they are compared to predetermined representations of possible voiceband digital data modem signals obtained under various transmission conditions, i.e., transmission impairments. The result of the comparison is employed to yield the identity of the incoming voiceband digital data modem signal as being j. The j output of discriminator 103 is supplied to utilization means 104 for use as desired. For example, j can be used to quantify the types of voiceband digital data modem signals being transmitted in a network.

Figure 2:
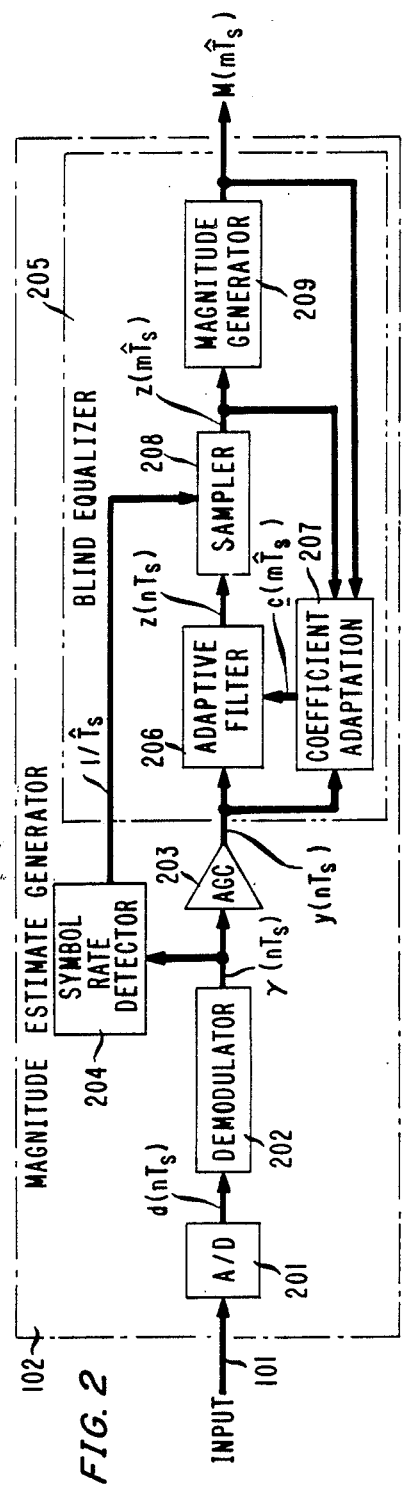
FIG. 2 shows, in simplified block diagram form, details of the magnitude estimate generator employed in the classifer of FIG. 1.

FIG. 2 shows, in simplified block diagram form, details of magnitude estimate generator 102 of FIG. 1. This particular embodiment uses a so-called baseband equalization technique. It will be apparent to those skilled in the art that a passband equalization technique may be equally employed to obtain the magnitude estimates. Accordingly, unknown voiceband digital data modem signals are supplied via input terminal 101 to analog-to-digital (A/D) converter 201 which generates a linear digital representation thereof, namely, $d(nT_s)$. It will also be apparent that, if the unknown signal is already in digital form, A/D converter 201 is not required. Similarly, if the unknown signal is in PCM digital form, it would be desirable to convert it to linear form.

Demodulator 202 generates, in well known fashion, a complex low-pass version of $d(nT_s)$, namely, $\gamma(nT_s)$. To this end, demodulator 202 preferably comprises a so-called Weaver demodulator. In this example, the carrier frequency $F_c$ used in demodulator 202 is selected to be $F_c = 1/2T_s = 2$ KHz for all input signals. Signal $\gamma(nT_s)$ is supplied to automatic gain control (AGC) 203 and to symbol rate detector 204.

AGC 203 generates a gain adjusted version $y(nT_s)$ of signal $\gamma(nT_s)$. Specifically, AGC 203 normalizes $\gamma(nT_s)$, in well known fashion, in accordance with $$y(nT_s) = \frac{\gamma(nT_s)}{\sqrt{E[|\gamma(nT_s)|^2]}} \qquad (1)$$

where $\sqrt{E[|\gamma(nT_s)|]}$ is an estimate of the RMS power of $\gamma(nT_s)$. Signal $y(nT_s)$ is supplied to blind equalizer 205 and, therein, to adaptive filter 206 and coefficient adaptation unit 207.

Symbol rate detector 204 generates a signal $(1/\hat{T}_s)$ representative of the nominal symbol rate of the unknown incoming voiceband digital data modem signal which is also supplied to blind equalizer 205 and, therein, to sampler 208. An arrangement for detecting the symbol rate of voiceband digital data modem signals including a Weaver demodulator for generating $\gamma(nT_s)$ is disclosed in co-pending U.S. patent application Ser. No. 927,506, filed Nov. 6, 1986 now U.S. Pat. No. 4,815,136 issued Mar. 21, 1989.

Blind equalizer 205 is, in this example, a so-called self-recovering equalizer. This is important because, as noted above the characteristics of the incoming voiceband digital data modem signal are unknown. Accordingly, blind equalizer 205, in this example, includes adaptive filter 206, coefficient adaptation unit 207, sampler 208 and magnitude generator 209. Adaptive filter 206 preferably is a standard non-recursive type having a plurality (L) of taps and operating at a rate of $1/T_s$. The output signal $z(nT_s)$ generated by adaptive filter 206 is defined as $$z(nT_s) = y(nT_s)'.c(nT_s) \qquad (2)$$

where $$y(nT_s) = [y(nT_s), y((n-1)T_s), \ldots, y([n-(L-1)]T_s)]' \qquad (3),$$

$$c(nT_s) = [c_0(nT_s), c_1(nT_s), \ldots, c_{L-1}(nT_s)]' \qquad (4)$$

and "'" denotes the mathematical transpose operation.

Output signal $z(nT_s)$ from adaptive filter 206 is supplied to sampler 208 which, in turn, yields $z(m\hat{T}_s)$. Sampler 208 is employed to sample the output $z(nT_s)$ of adaptive filter 206 at the nominal symbol rate of the unknown incoming voiceband digital data modem signal, namely, $(1/\hat{T}_s)$ Hz, to yield $z(m\hat{T}_s)$. In turn, magnitude generator 209 generates the magnitude of $z(m\hat{T}_s)$, namely, $M(m\hat{T}_s)$ in well known fashion. Thus, a sequence of magnitude estimates $M(m\hat{T}_s)$ is generated at the symbol rate of the incoming voiceband digital data modem signal and is supplied to discriminator 103 and to coefficient adaptation unit 207.

Coefficient adaptation unit 207 is responsive to $y(nT_s)$, $z(m\hat{T}_s)$, and $M(m\hat{T}_s)$ to generate updated tap coefficients for adaptive filter 206 in accordance with $$c((m + 1)\hat{T}_s) = c(m\hat{T}_s) - \gamma y^*(m\hat{T}_s)z(m\hat{T}_s)\left[1 - \frac{1}{M(m T_s)}\right] \quad (5)$$

where $\lambda$ is a predetermined filter convergence coefficient and $y^*(mT_s)$ is the complex conjugate of $y(mT_s)$. A similar arrangement for updating adaptive filter tap coefficients is described in an article entitled "Self-Recovering Equalization and Carrier Tracking in Two-Dimensional Data Communication Systems", *IEEE Transactions on Communications*, Vol. COM-28, No. 11, Nov. 1980, pages 1867–1875.

Figure 3:
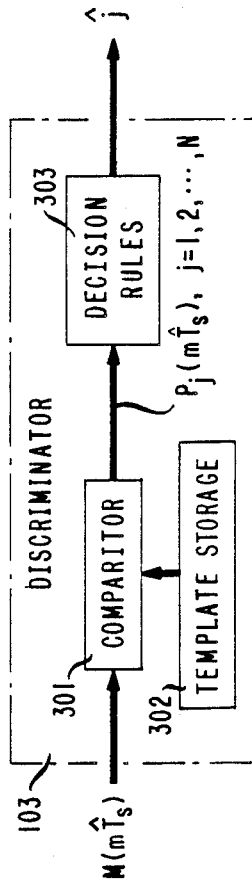
FIG. 3 depicts, in simplified block diagram form, details of the discriminator used in the classifier of FIG. 1.

FIG. 3 shows, in simplified block diagram form, details of discriminator 103. Accordingly, shown are comparator 301, template storage unit 302 and decision rules unit 303. Magnitude estimates $M(m\hat{T}_s)$ are supplied to comparator 301 where they are compared to predetermined representations of possible voiceband digital data modem signals obtained under various transmission conditions, i.e., impairments. In this example, the predetermined representations are in the form of templates of conditional density functions of possible voiceband digital data modem signals to be classified. A number (N) of such templates are stored in template storage unit 302.

Figure 5:
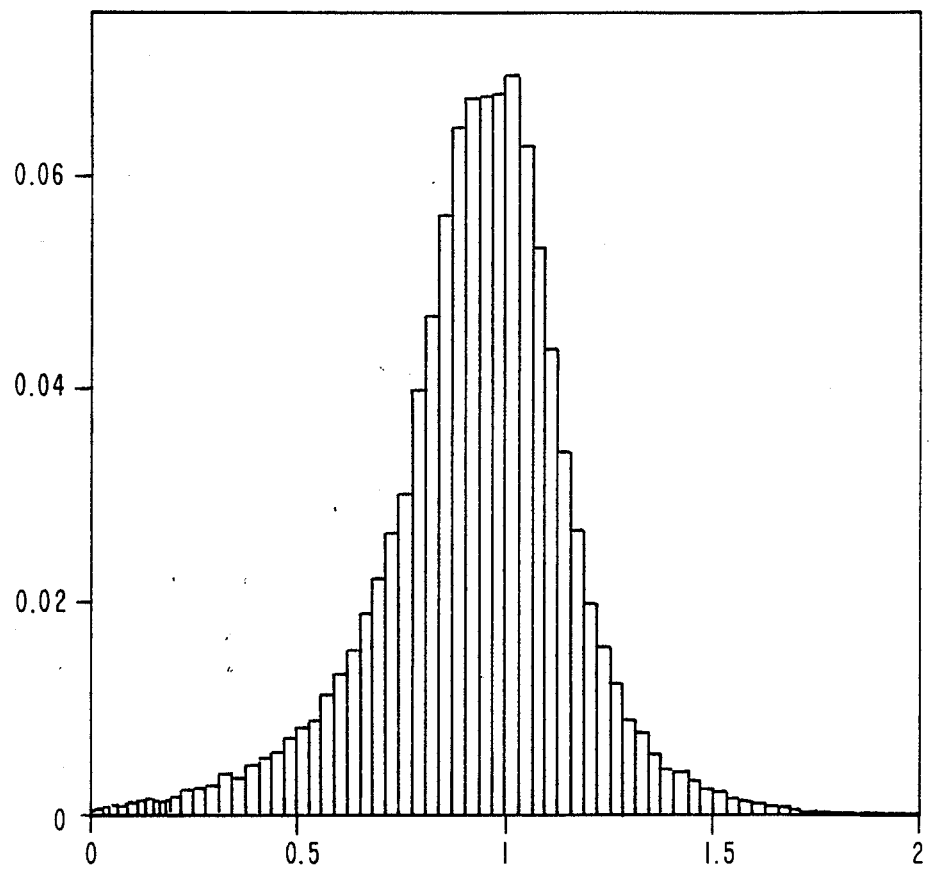
FIGS. 5, 6 and 7 are graphic representations of conditional density functions of the voiceband digital data modem signal magnitude estimates at their symbol rate.
Figure 6:
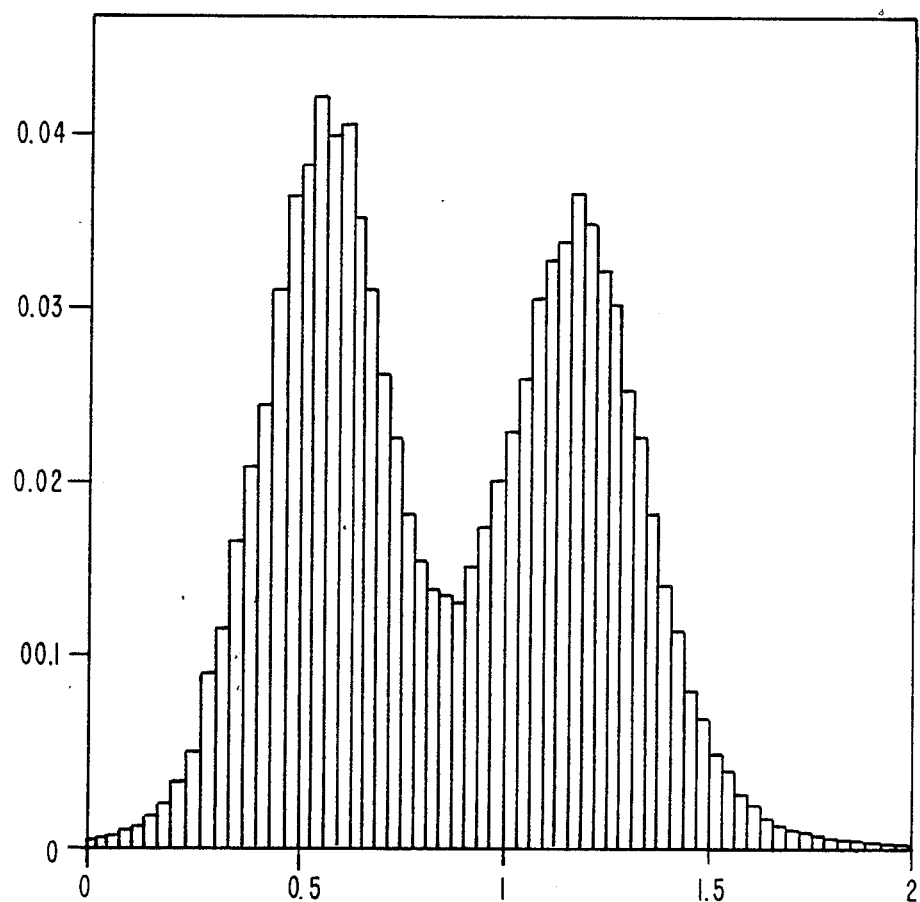
Figure 7:
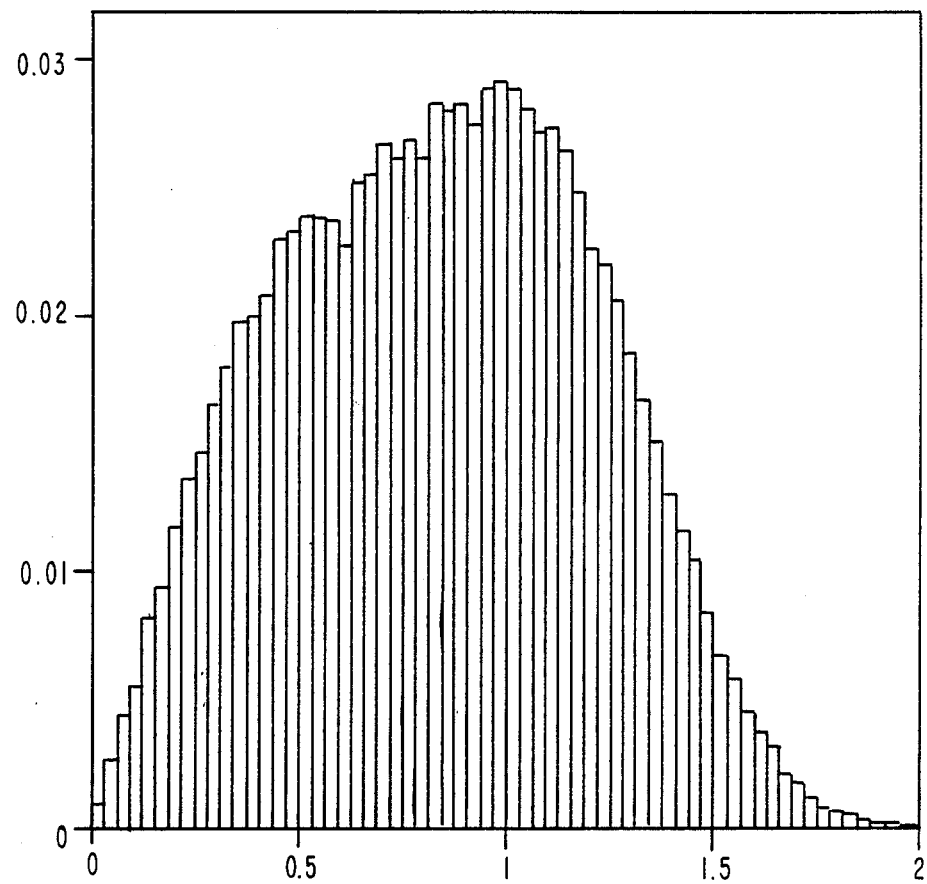

It will be apparent that any number of such templates may be generated either empirically or analytically. For simplicity and clarity of description, only three (3) examples of such templates are shown. Specifically, FIG. 5 is a graphic illustration of the conditional density function of magnitude estimates of a voiceband digital data modem signal generated by a CCITT V.29 modem at 4800 bits/sec and having a symbol rate of 2400 baud, namely, $p(M(m\hat{T}_s)|j=1)$. This template was obtained by using a known CCITT V.29 modem generated signal under known conditions utilizing magnitude estimate generator 102. FIG. 6 is a graphic illustration of the conditional density function of magnitude estimates of a voiceband digital data modem signal generated by a CCITT V.29 modem at 7200 bits/sec and also having a symbol rate of 2400 baud, namely, $p(M(mT_s)|j=2)$. FIG. 7 is another graphic illustration of the conditional density function of magnitude estimates of a voiceband digital data modem signal generated by a CCITT V.29 modem at 9600 bits/sec and also having a symbol rate of 2400 baud, namely, $p(M(m\hat{T}_s)|j=3)$. These templates are stored in template storage unit 302.

It will be apparent to those skilled in the art that similar templates can be readily obtained for other voiceband digital data modem signals generated by various digital data modem signal sources and under various transmission channel impairment conditions. Moreover, other techniques may be used to obtain the templates. For example, they may be obtained analytically based on the particular voiceband digital data modem signal constellation under various transmission channel impairment conditions.

It should also be understood that the templates may comprise representations other than the conditional density functions of the magnitude estimates of the voiceband digital data modem signals to be classified. For example, they may comprise a set of threshold values corresponding to an expected sequence of magnitude estimates for the voiceband digital data modem signal being classified. The classification is achieved by measuring the variance of the generated sequence of magnitude estimates to the expected sequence of magnitude estimates and, then, comparing the variance value to one or more threshold values.

Decision rules unit 303 is responsive to the result obtained by comparator 301, namely, the probability $P_j(m\hat{T}_s)$ that the sequence of magnitude estimates through time $(m\hat{T}_s)$ matches one of the stored templates, thereby identifying the particular digital data modem signal source. Again, for simplicity and clarity of description only $j=1,2,3$ voiceband digital data modem signals are being considered.

Figure 8:
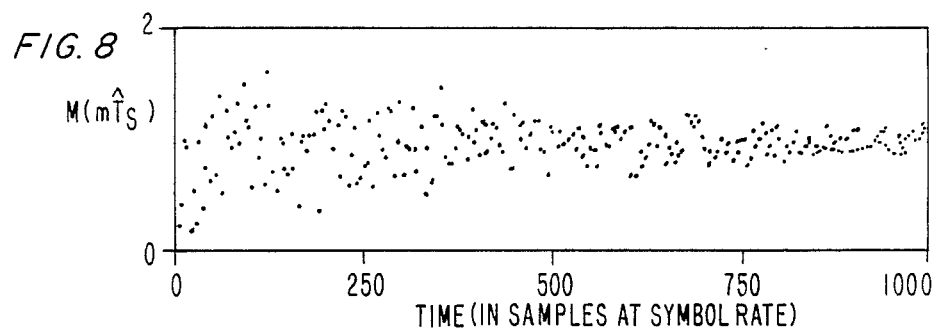
FIG. 8 is a graphic representation of magnitude estimates generated for a voiceband digital data modem signal with channel impairments.
Figure 9:
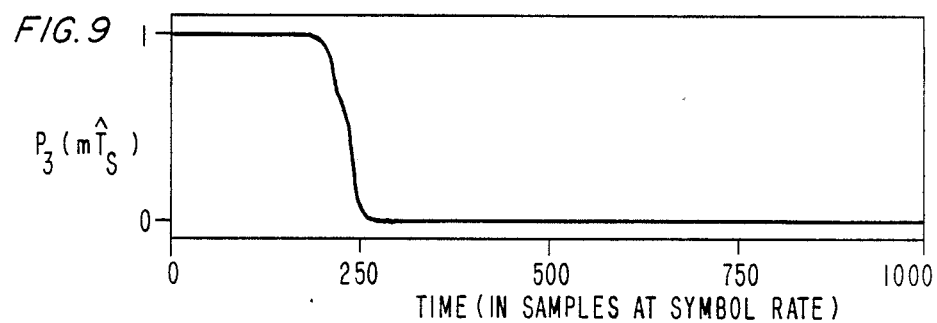
FIGS. 9, 10 and 11 are graphic representations illustrating the probability of the magnitude representation of FIG. 8 being that of particular voiceband digital data modem signals.
Figure 10:
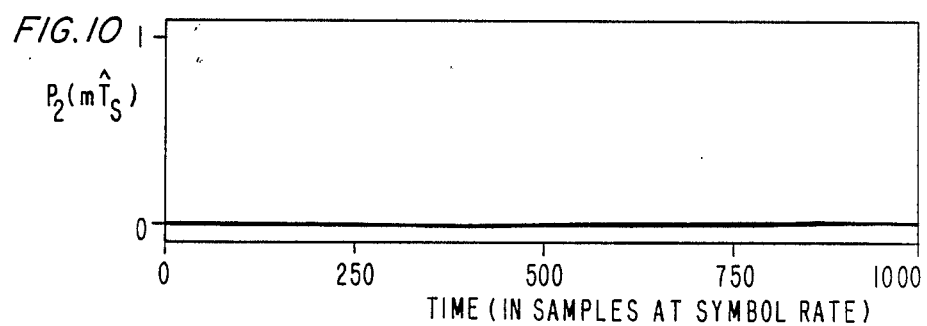
Figure 11:
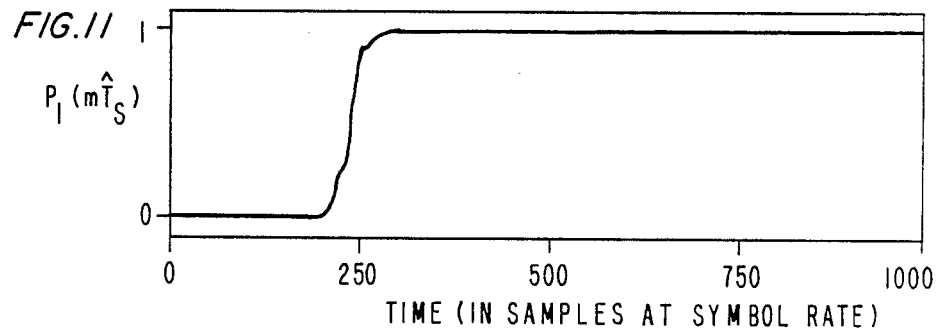

The graphic representations of FIGS. 8 through 11 will assist in the explanation of the operation of discriminator 103. Accordingly, FIG. 8 illustrates a sequence of magnitude estimates $M(m\hat{T}_s)$ versus time in samples at the symbol rate of a voiceband digital data modem signal generated by a CCITT V.29 modem operating at 4800 bits/sec and having a symbol rate of 2400 baud. FIG. 9 shows the probability $P_3(mT_s)$ versus time in samples at the symbol rate of the voiceband digital data modem signal represented in FIG. 8, that the sequence of magnitude estimates through time $(mT_s)$ matches the stored template corresponding to $j=3$ (FIG. 7). That is, the probability that the sequence of magnitude estimates through time $(m\hat{T}_s)$ was obtained in response to a voiceband digital data modem signal generated by a CCITT V.29 modem operating at 9600 bits/sec and having a symbol rate of 2400 baud. FIG. 10 illustrates the probability $P_2(m\hat{T}_s)$ versus time in samples at the symbol rate of the voiceband digital data modem signal represented in FIG. 8, that the sequence of magnitude estimates through time $(m\hat{T}_s)$ matches the stored template corresponding to $j=2$ (FIG. 6). That is, the probability that the sequence of magnitude estimates through time $(mT_s)$ was obtained in response to the voiceband digital data modem signal generated by a CCITT V.29 modem operating at 7200 bits/sec and having a symbol rate of 2400 baud. Finally, FIG. 11 depicts the probability $P_1(mT_s)$ that the sequence of magnitude estimates through time $(m\hat{T}_s)$ versus time in samples at the symbol rate of the voiceband digital data modem signal represented in FIG. 8 matches the stored template corresponding to $j=1$ (FIG. 5). That is, the probability that the sequence of magnitude estimates through time $(mT_s)$ was obtained in response to a voiceband digital data modem signal generated by a CCITT V.29 modem operating at 4800 bits/sec and having a symbol rate of 2400 baud.

Thus, it is seen from FIGS. 8 through 11 that initially the unknown voiceband digital data modem signal of FIG. 8 appears to be that corresponding to template $j=3$, as indicated in FIG. 9. It never appears to be the voiceband digital data modem signal corresponding to $j=2$, as indicated in FIG. 10. After some time has passed and blind equalizer 205 has begun to converge, the unknown voiceband digital data modem signal is identified as the voiceband data signal corresponding to template $j=1$, as shown in FIG. 11. In this example, template $j=1$ corresponds to the voiceband digital data modem signal generated by the CCITT V.29 modem operating at 4800 bits/sec and having a symbol rate of 2400 baud. Accordingly, the decision rules implemented in decision rules unit 303, in this example, are such that if the probability $P_j(m\hat{T}_s)$, for $j=1,2,\ldots,N$ that the unknown voiceband digital data modem signal magnitude estimates $M(m\hat{T}_s)$ match the stored templates exceeds a predetermined threshold value for a predetermined number of samples at the unknown voiceband digital data modem signal symbol rate, then the unknown voiceband digital data modem signal is being generated by a digital data modem signal source that generated the matched template.

Specifically, the decision rules are, in this example:

(1) If $P_1(mT_s) \geq 0.85$ for 35 consecutive samples at the unknown digital data modem signal symbol rate, the unknown voiceband digital data modem signal is $j=1$.

(2) If $P_2(mT_s) \geq 0.85$ for 35 consecutive samples at the unknown digital data modem signal symbol rate, the unknown voiceband digital data modem signal is $j=2$.

(3) If after 8000 samples at the unknown voiceband digital data modem signal symbol rate neither condition (1) nor (2) has been met, the unknown voiceband digital data modem signal is $j=3$.

Again, for simplicity and clarity of description only three (3) decision rules have been presented. It will be apparent to those skilled in the art that when more than three (3) voiceband digital data modem signals are to be classified more decision rules will be required.

Figure 4:
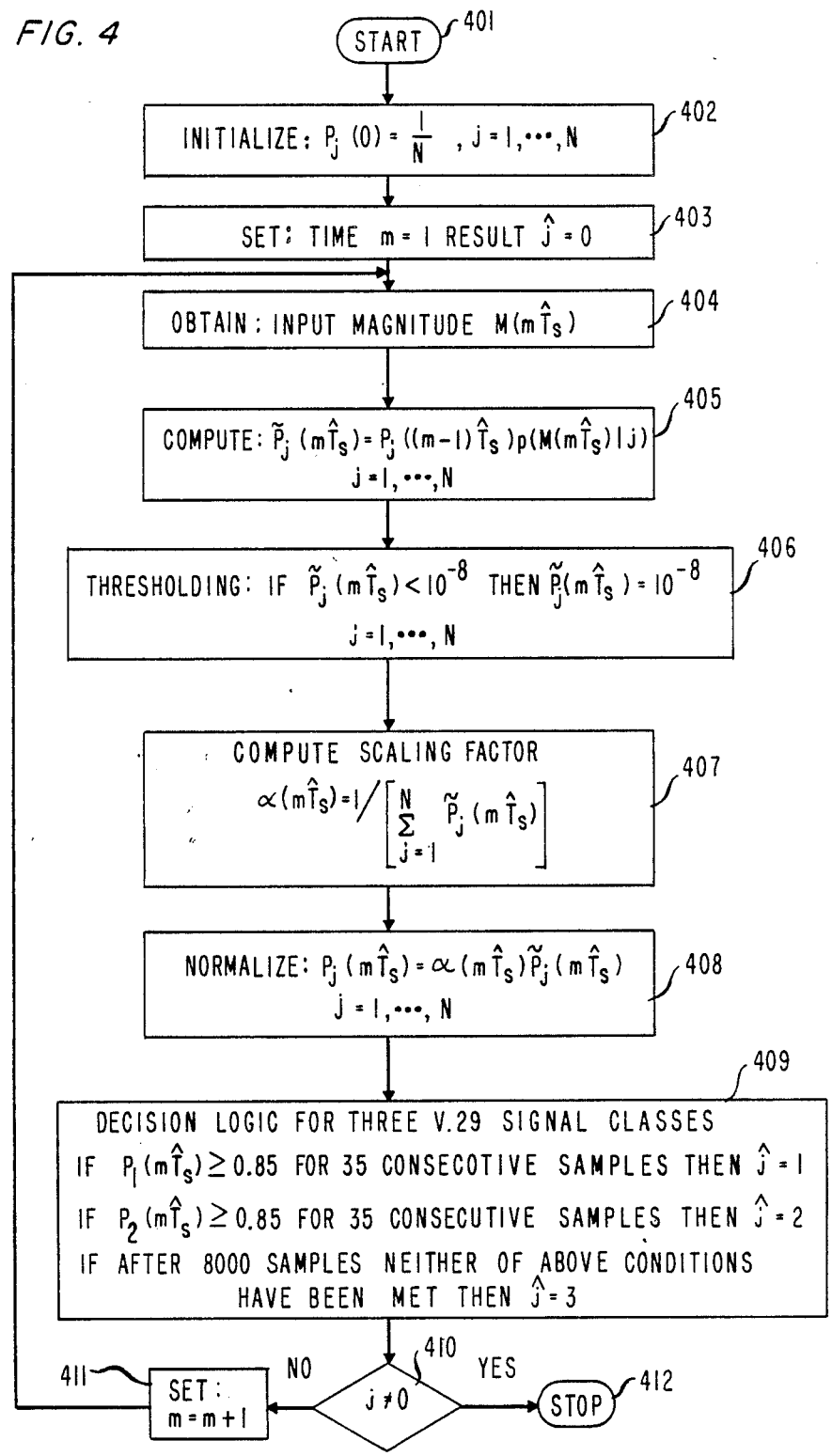
FIG. 4 illustrates a flow chart of a program sequence of steps defining the operation of the discriminator of FIG. 3.

Operation of discriminator 103 (FIG. 3) is best described via use of the flow chart shown in FIG. 4. Accordingly, the routine shown in the flow chart of FIG. 4 is entered via start step 401. Thereafter, operational block 402 initializes the probability that the incoming unknown voiceband digital data modem signal matches the stored templates at time zero (0) namely, sets $$P_j(0) = \frac{1}{N} \text{ for } j = 1, 2, \ldots, N,$$

where N is the number of stored templates. Operational block 403 sets time index $m=1$ and result indicator $j=0$. j represents the voiceband digital data modem signal corresponding to template j. Operational block 404 obtains a next magnitude estimate $M(m\hat{T}_s)$. Then, operational blocks 405 through 408 cause the generation of an updated probability value $P_j(m\hat{T}_s)$ that the incoming voiceband digital data modem signal matches the stored templates, namely, $$\widetilde{P}_j(m\hat{T}_s) = \frac{\prod_{i=1}^{m} p(M(i\hat{T}_s)|j)}{\sum_{k=1}^{N} \left[ \prod_{i=1}^{m} p(M(i\hat{T}_s)|k) \right]} \quad (6)$$

for $j=1,2,\ldots, N$.

Since it is difficult to compute $P_j(m\hat{T}_s)$ directly a number of intermediate steps are shown in operational blocks 405 through 408. Thus, operational block 405 generates an intermediate update of the prior probability that the magnitude estimates obtained though time $((m-1)T_s)$ match the stored templates, namely, $$\widetilde{P}_j(mT_s) = P_j((m-1)T_s)p(M(mT_s)|j) \quad (7)$$

where $j=1,2,\ldots, N$.

Operational block 406 limits the intermediate update obtained in operational block 405 so that the intermediate update value does not become too small, namely, if $\widetilde{P}_j(mT_s) < 10^{-8}$ then set $\widetilde{P}_j(mT_s) = 10^{-8}$ for $j=1,2,\ldots, N$.

Operational block 407 generates a scaling factor as follows:

$$a(m\hat{T}_s) = \frac{1}{\sum_{j=1}^{N} \widetilde{P}_j(m\hat{T}_s)} \quad (8)$$

Finally, operational block 408 generates the updated probability as follows:

$$P_j(m\hat{T}_s) = a(m\hat{T}_s)\widetilde{P}_j(m\hat{T}_s) \quad (9)$$

for $j=1,2,\ldots, N$.

Operational block 409 causes the decision rules described above to be implemented, namely, (1) if $P_1(m\hat{T}_s) \geq 0.85$ for 35 consecutive samples at the unknown voiceband digital data modem signal baud, the unknown signal is $\hat{j}=1$. That is, the unknown digital data modem signal corresponds to the voiceband digital data modem signal identified by stored template $\hat{j}=1$. In this example, template $\hat{j}=1$ corresponds to a voiceband digital data modem signal generated by a CCITT V.29 modem operating at 4800 bits/sec and having a symbol rate of 2400 baud. (2) If $P_2(m\hat{T}_s) \geq 0.85$ for 35 consecutive samples at the unknown voiceband digital data modem signal baud, the unknown signal is $\hat{j}=2$. That is, the unknown signal corresponds to the voiceband digital data modem signal identified by stored template $\hat{j}=2$. In this example, template $\hat{j}=2$ corresponds to a voiceband digital data modem signal generated by a CCITT V.29 modem operating at 7200 bits/sec and having a baud of 2400. (3) If after 8000 samples at the baud of the unknown voiceband digital data modem signal neither condition (1) nor (2) has been met, the unknown signal is defined as $\hat{j}=3$. That is, the unknown signal corresponds to the voiceband data signal identified by template $\hat{j}=3$. In this example, template $\hat{j}=3$ corresponds to a voiceband digital data modem signal generated by a CCITT V.29 mode operating at 9600 bits/sec and having a symbol rate of 2400 baud. Again, it will be apparent to those skilled in the art that other decision rules may equally be employed to classify the unknown voiceband digital data modem signal as being generated by one of a plurality of the digital data modem signal sources.

Conditional branch point 410 tests to determined if the unknown voiceband digital data modem signal has been identified, namely, if $\hat{j} \neq 0$. If the test result is YES, $\hat{j} \neq 0$ and the unknown signal has been identified and, thereafter, the process is stopped via step 412. If the test result is NO, $\hat{j}=0$ and the unknown voiceband digital data modem signal has as yet not been identified. Thereafter, operational block 411 sets $m=m+1$ and steps 404 through 411 are iterated until conditional branch point 410 yields a YES test result.

We claim:

1. Apparatus for classifying unknown voiceband digital data modem generated signals, comprising:
   means for detecting a nominal symbol rate of an incoming unknown voiceband digital data modem signal;
   means for generating a sequence of prescribed magnitude estimates of the incoming voiceband digital data modem signal at said detected nominal symbol rate; and
   means for employing said sequences of prescribed magnitude estimates to identify the incoming unknown voiceband digital data modem signal as being generated by a particular digital data modem signal source.

2. The invention as defined in claim 1 wherein said means for employing includes means for comparing said sequence of prescribed magnitude estimates to predetermined representations of possible known voiceband digital data modem signals and means for using the results of said comparing to identify the incoming unknown voiceband digital data modem signal as being generated by one of a plurality of possible digital data modem signal sources.

3. The invention as defined in claim 2 wherein said predetermined representations are predetermined magnitude estimates obtained at the symbol rates of the known possible voiceband digital data modem signals.

4. The invention as defined in claim 2 wherein said predetermined representations are a plurality of templates representative of said plurality of known possible voiceband digital data modem signals.

5. The invention as defined in claim 4 wherein each of said plurality of templates comprises a conditional density function of magnitude estimates obtained at the symbol rate of a corresponding one of said plurality of known possible voiceband digital data modem signals and identifies the corresponding voiceband digital data modem signal as being generated by a corresponding digital data modem signal source.

6. The invention as defined in claim 5 where said means for comparing includes means for generating a probability of said sequence of magnitude estimates matching said templates and said means for using is responsive to said probability to identify the template that is matched, said matched template corresponding to one of said plurality of known possible voiceband digital data modem signals and identifies the unknown voiceband digital data modem signal as being generated by a corresponding digital data modem signal source.

7. The invention as defined in claim 2 wherein said means for generating said sequence of magnitude estimates includes adaptive equalizer means responsive to said detected nominal symbol rate.

8. The invention as defined in claim 7 wherein said adaptive equalizer means comprises a self-recovering equalizer.

9. The invention as defined in claim 8 wherein said predetermined representations are a plurality of templates each of which comprises a conditional density function of magnitude estimates obtained at the symbol rate of a corresponding one of said plurality of known possible voiceband digital data modem signals, wherein said means for comparing includes means for generating a probability of said sequence of magnitude estimates matching said templates, and wherein said means for using is responsive to said probability to identify the template that is matched, said matched template corresponding to one of said plurality of known possible voiceband digital data modem signals and identifies the voiceband digital data modem signal as being generated by a corresponding digital data modem signal source.

* * * * *